US009118231B2

(12) United States Patent
Matsubara et al.

(10) Patent No.: US 9,118,231 B2
(45) Date of Patent: Aug. 25, 2015

(54) STATOR OF ROTATING ELECTRICAL MACHINE AND ROTATING ELECTRICAL MACHINE

(75) Inventors: Masakatsu Matsubara, Yokkaichi (JP); Takashi Hanai, Nagoya (JP); Wataru Ito, Inabe-gun (JP)

(73) Assignees: Kabushiki Kaisha Toshiba, Tokyo (JP); Toshiba Industrial Products Manufacturing Corporation, Mie (JP)

( * ) Notice: Subject to any disclaimer, the term of this patent is extended or adjusted under 35 U.S.C. 154(b) by 538 days.

(21) Appl. No.: 13/571,584

(22) Filed: Aug. 10, 2012

(65) Prior Publication Data

US 2012/0306309 A1 Dec. 6, 2012

Related U.S. Application Data

(63) Continuation of application No. PCT/JP2011/052897, filed on Feb. 10, 2011.

(30) Foreign Application Priority Data

Feb. 12, 2010 (JP) ................................ 2010-028859

(51) Int. Cl.
*H02K 3/28* (2006.01)

(52) U.S. Cl.
CPC ....................................... *H02K 3/28* (2013.01)

(58) Field of Classification Search
CPC ................................ H02K 3/28; H02K 5/225
USPC .................................. 310/71, 180, 184, 198
See application file for complete search history.

(56) References Cited

U.S. PATENT DOCUMENTS

| | | | |
|---|---|---|---|
| 3,308,363 A * | 3/1967 | Rawcliffe et al. | 318/773 |
| 4,284,919 A * | 8/1981 | Auinger | 310/198 |
| 5,006,745 A * | 4/1991 | Nishio et al. | 310/177 |
| 5,982,067 A * | 11/1999 | Sebastian et al. | 310/184 |
| 6,998,750 B2 * | 2/2006 | Anma et al. | 310/198 |
| 2008/0012444 A1 | 1/2008 | Hattori | |
| 2008/0174196 A1 | 7/2008 | Hattori | |
| 2012/0248923 A1 * | 10/2012 | Kimura et al. | 310/198 |
| 2015/0061450 A1 * | 3/2015 | Nakagawa | 310/198 |

FOREIGN PATENT DOCUMENTS

| | | |
|---|---|---|
| JP | 2006-311716 A | 11/2006 |
| JP | 2006-311733 A | 11/2006 |
| JP | 2008-109796 A | 5/2008 |
| JP | 2009-254135 A | 10/2009 |
| JP | 2010-022082 A | 1/2010 |

* cited by examiner

*Primary Examiner* — Dang Le
(74) *Attorney, Agent, or Firm* — Baker Botts L.L.P.

(57) ABSTRACT

A stator of rotating electrical machine includes a stator core and stator coils. The stator coils have n number (where n≥6) unit coils, a first coil group and a second coil group. The unit coils of the first coil group include a first unit coil located nearest the first power supply terminal. The unit coils of the first coil group include a second unit coil. The unit coils of the first coil group include a third unit coil located third nearest the first power supply terminal and adjacent to the second unit coil of the second coil group. The unit coils of the second coil group include a third unit coil located third nearest the second power supply terminal and adjacent to the second unit coil of the first coil group.

6 Claims, 13 Drawing Sheets

STATOR OF ROTATING ELECTRICAL MACHINE AND ROTATING ELECTRICAL MACHINE

CROSS-REFERENCE TO RELATED APPLICATIONS

This application is based upon and claims the benefit of priority from the prior Japanese Patent Application No. 2010-28859 filed on Feb. 12, 2010 and International Application No. PCT/JP2011/052897 filed on Feb. 10, 2011, the entire contents of both of which are incorporated herein by reference.

FIELD

Embodiments described herein relate to a stator of a rotating electrical machine and a rotating electrical machine provided with the stator.

BACKGROUND

Conventional rotating electrical machines for vehicles, which are mounted as drive electric motors in electric vehicles or hybrid cars, include a type in which each one of a plurality of phases of a stator includes two parallel connected coil groups each of which further includes a plurality of series connected unit coils. The unit coils are wound on a stator core so that each unit coil forms a magnetic pole.

DETAILED DESCRIPTION

In general, according to one embodiment, a stator of a rotating electrical machine includes a stator core and stator coils of a plurality of phases wound on the stator core. The stator coils have an n number (where $n \geq 6$) of unit coils arranged circumferentially with respect to the stator core, a first coil group constituted by a part of the unit coils, said part having a same polarity and being series connected, the first coil group having two terminals one of which is connected to a first power supply input terminal and the other of which is connected to a first neutral terminal, and a second coil group constituted by a remaining part of the unit coils, said remaining part having a polarity reverse to the unit coils of the first group and being series connected, the second coil group having two terminals one of which is connected to a second power supply input terminal and the other of which is connected to a second neutral terminal. The unit coils constituting the first coil group include a first unit coil which is located nearest the first power supply terminal and is adjacent to a first unit coil which constitutes the second coil group and is located nearest the second power supply terminal. The unit coils constituting the first coil group include a second unit coil which is located second nearest the first power supply terminal and is adjacent to the first unit coil of the second coil group. The unit coils constituting the second coil group include a second unit coil which is located second nearest the second power supply terminal and is adjacent to the first unit coil of the first coil group. The unit coils constituting the first coil group include a third unit coil which is located third nearest the first power supply terminal and is adjacent to the second unit coil of the second coil group. The unit coils constituting the second coil group include a third unit coil which is located third nearest the second power supply terminal and is adjacent to the second unit coil of the first coil group.

Several embodiments of the stator of a rotating electrical machine will be described with reference to the accompanying drawings. Identical or similar parts or components will be affixed with the same reference symbols throughout the embodiments and duplicate description of such parts or components will be eliminated.

First Embodiment

A first embodiment is an application to a permanent magnet motor of the inverter drive type, used with electric vehicles or hybrid cars.

Figure 3:
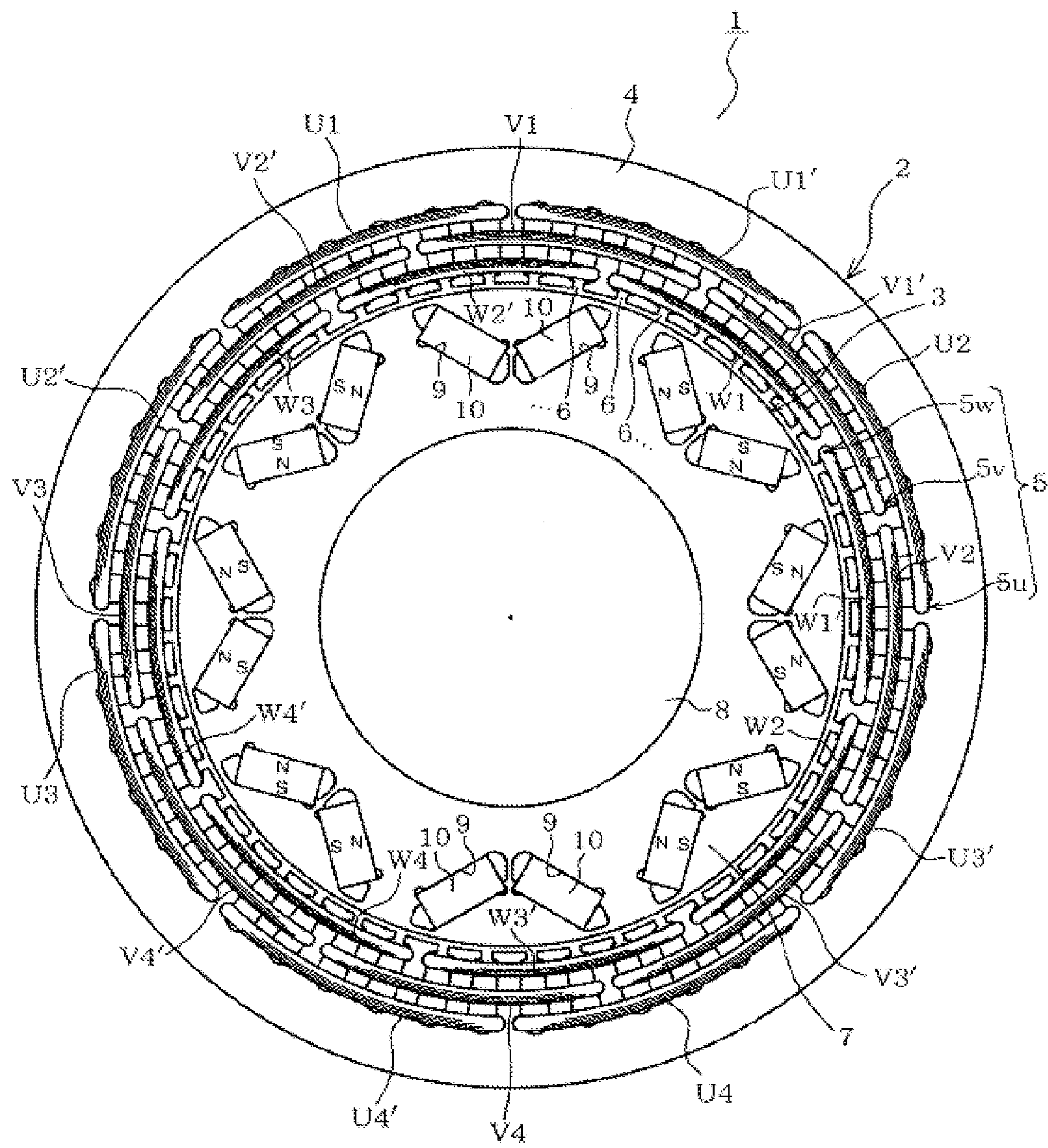
FIG. 3 is a schematic diagram showing a configuration of a permanent magnet motor.

Referring to FIG. 3, the permanent magnet motor 1 serving as a rotating electrical machine includes a stator 2 and a rotor 3. The stator 2 includes a stator core 4 and stator coils 5 of a plurality of phases wound on the stator core 4. More specifically, for example, the stator coils 5 are constituted by a U-phase coil 5*u*, a V-phase coil 5*v* and a W-phase coil 5*w*. The stator core 4 is formed into a cylindrical shape and constituted by stacking a plurality of annular iron core materials comprising magnetic steel sheets into an integral construction.

The stator core 4 has slots 6 formed in an inner circumferential side thereof at predetermined angular intervals. Forty-eight slots 6 are formed in total and accommodate phase stator coils 5*u* to 5*w* respectively. Pieces of slot insulating paper (not shown) are placed in the respective slots 6, so that electrical insulation is provided between the stator core 4 and the phase stator coils 5*u* to 5*w* accommodated in the respective slots 6.

The rotor 3 includes a cylindrical rotor core 7 and a rotating shaft 8. The rotating shaft 8 is located at an inner circumferential side of the rotor core 7. The rotor core 7 is formed by stacking a plurality of annular iron core materials comprising magnetic steel sheets into an integral construction. The rotor 3 is disposed in a field space of the stator 2, and a slight gap is defined between an outer circumferential surface of the rotor 3 and an inner circumferential surface of the stator 2, whereby the rotor 3 is rotatable relative to the stator 2. The rotating shaft 8 extends through the rotor core 7 in the stacking direction of the iron core materials to be fixed to the rotor core 7.

The rotor core 7 has a pair of magnetic body slots which are formed in an outer circumferential side thereof and have a distance therebetween that is gradually rendered larger as the slots extends axially outward. Eight pairs of such magnetic body slots 9 are formed so as to correspond to eight poles. The magnetic body slots 9 are formed at regular intervals so as to extend in a circumferential direction of the rotor core 7. The magnetic body slots 9 extend through the rotor core 7 in a stacking direction of the core materials. Permanent magnets 10 are inserted in the respective magnetic body slots 9. Each pair of permanent magnets 10 have north and south poles with reverse arrangement with respect to north and south poles of the adjacent pair of permanent magnets 10. The permanent magnets 10 establish magnetic poles of the permanent magnet motor 1.

Figure 4:
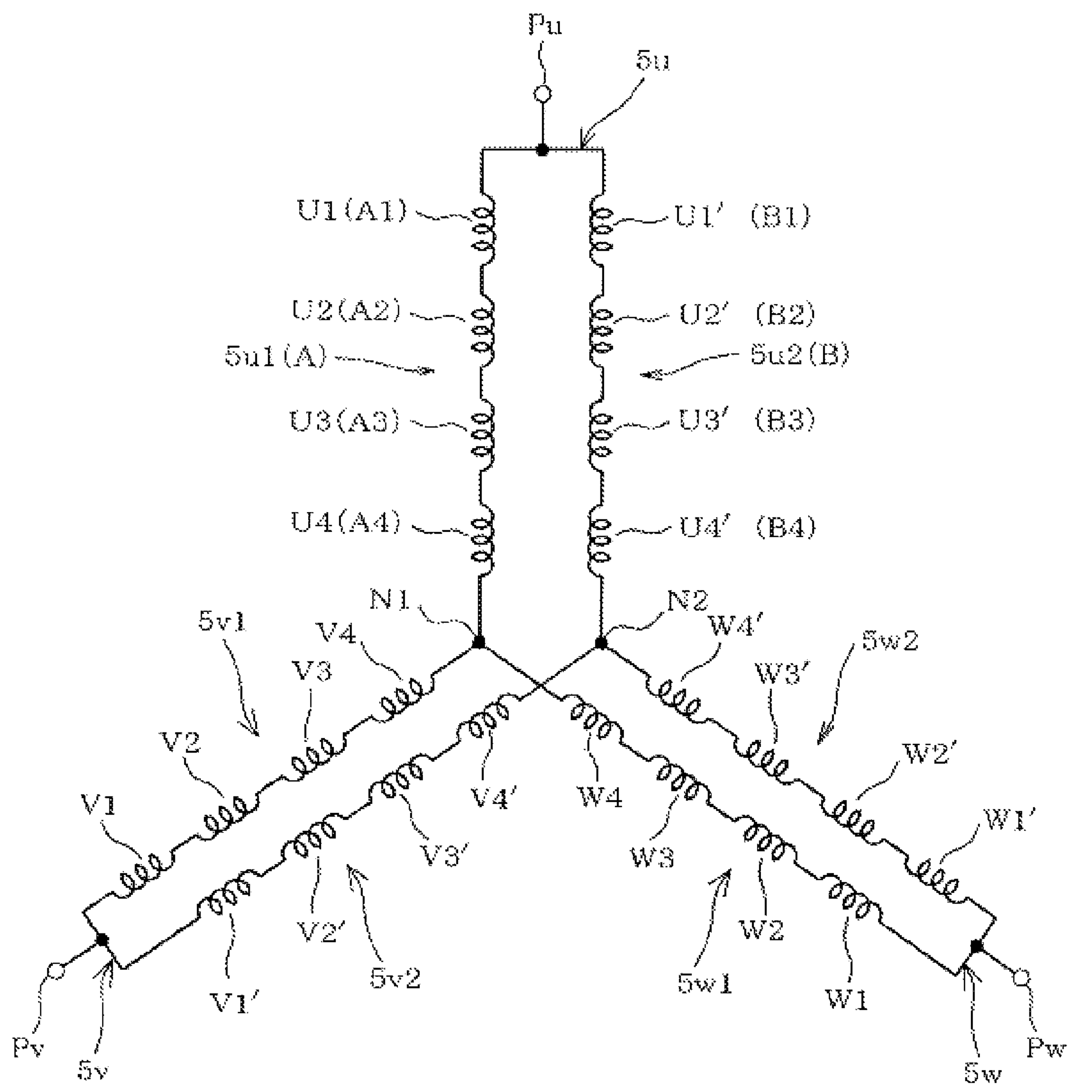
FIG. 4 is a schematic diagram showing a circuit equivalent to three-phase stator coils.

FIG. 4 shows an electrical circuit equivalent to the three-phase stator coils 5*u* to 5*w*. The U-phase coil 5*u* includes a plurality of, for example, eight unit coils. The U-phase coil 5*u* includes a first coil group 5*u*1 and a second coil group 5*u*2. The first coil group 5*u*1 includes first to fourth unit coils U1 to U4 which are connected in series to one another. The second coil group 5*u*2 includes first to fourth unit coils U1' to U4' which are connected in series to one another. The V-phase coil 5*v* also includes a first coil group 5*v*1 and a second coil group 5*v*2 in the same manner as the U-phase coil 5*u*. The first coil group 5*v*1 includes first to fourth unit coils V1 to V4 which are connected in series to one another. The second coil group 5*v*2 includes first to fourth unit coils V1' to V4'. The W-phase coil 5*w* also includes a first coil group 5*w*1 and a second coil group 5*w*2 in the same manner as the U-phase coil 5*u*. The first coil group 5*w*1 includes first to fourth unit coils W1 to W4. The second coil group 5*w*2 includes first to fourth unit coils W1' to W4'.

The first coil groups 5*u*1, 5*v*1 and 5*w*1 are star-connected via a neutral terminal N1. The second coil groups 5*u*2, 5*v*2 and 5*w*2 are star-connected via a neutral terminal N2. The star-connected first coil groups 5*u*1, 5*v*1 and 5*w*1 have respective one terminals connected to three-phase power supply input terminals Pu, Pv and Pw respectively. The star-connected second coil groups 5*u*2, 5*v*2 and 5*w*2 also have respective one terminals connected to the three-phase power supply input terminals Pu, Pv and Pw respectively. The sequence of unit coils in the above description is determined on the basis of closeness to the respective phase power supply input terminals Pu, Pv and Pw.

Figure 2:
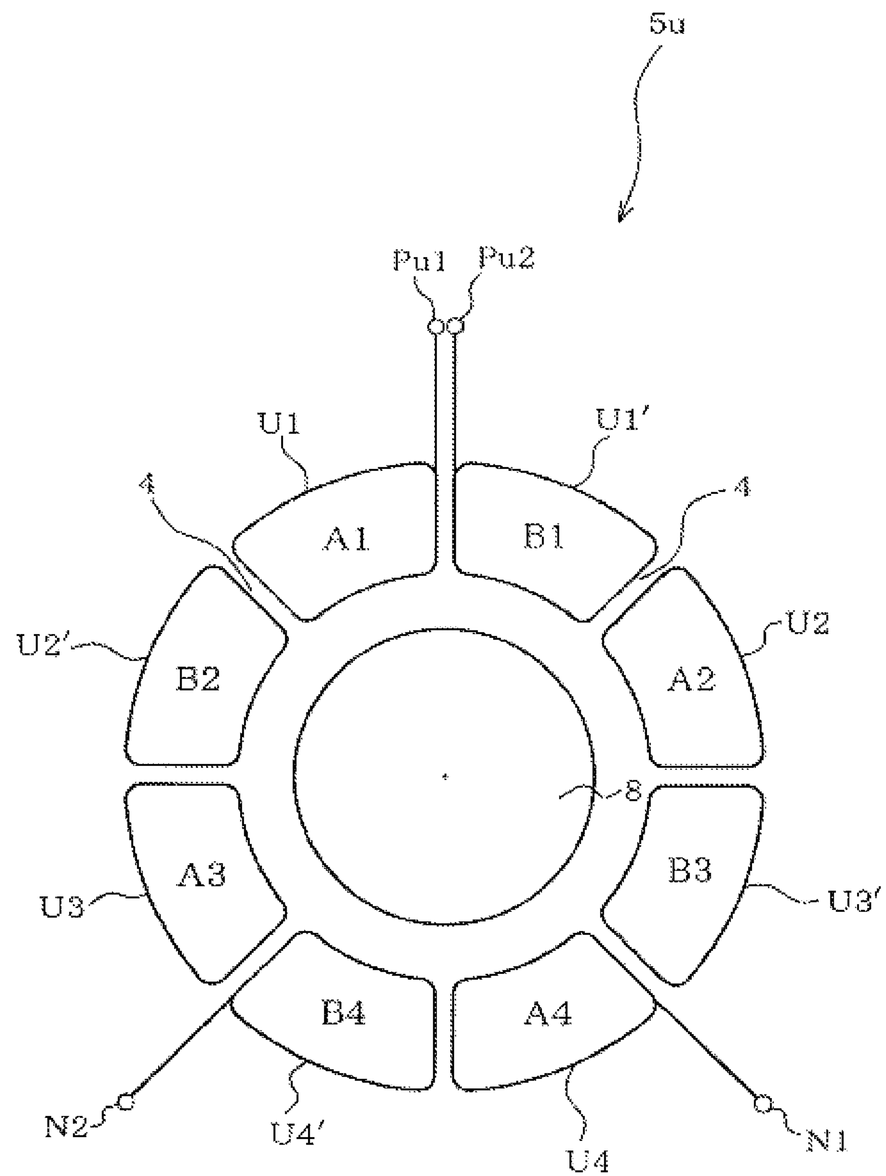
FIG. 2 is a schematic diagram showing an arrangement of the U-phase stator coils.

FIG. 2 schematically shows an arrangement of the U-phase coil 5*u*. As shown, eight unit coils are arranged throughout the circumference of the stator core 4. More specifically, the unit coils A1 (U1) to A4 (U4) of the first coil group A (5*u*1) and the unit coils B1 (U1') to B4 (U4') of the second coil group B (5*u*2) are arranged alternately throughout the circumference of the stator core 4 without being located adjacent to each other.

More specifically, the first unit coil A1 of the first coil group A and the first unit coil B1 of the second coil group B are arranged adjacent to each other at an upper part of the stator core 4. The second unit coil A2 of the first coil group A is arranged adjacent to the first unit coil B1 of the second coil group B. The second unit coil B2 of the second coil group B is arranged adjacent to the first unit coil A1 of the first coil group A. The third unit coil A3 of the first coil group A is arranged adjacent to the second unit coil B2 of the second coil group B. The third unit coil B3 of the second coil group B is arranged adjacent to the second unit coil A2 of the first coil group A.

Furthermore, the fourth unit coil A4 of the first coil group A is arranged adjacent to the third unit coil B3 of the second coil group B. The fourth unit coil B4 of the second coil group B is arranged adjacent to the third unit coil A3 of the first coil group A. The fourth unit coils A4 and B4 are arranged adjacent to each other at a lower part of the stator core 4.

Figure 1:
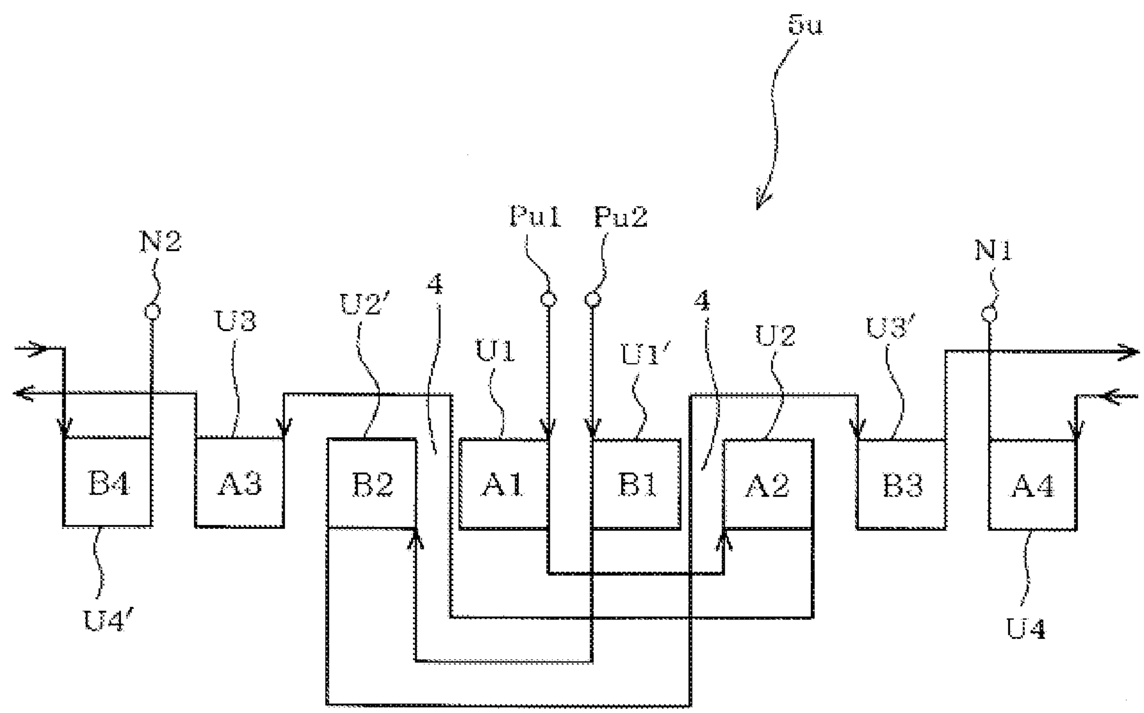
FIG. 1 is a schematic diagram showing a connecting configuration of U-phase stator coils in a first embodiment.

FIG. 1 schematically shows electrical connection of the unit coils of the U-phase coil 5*u*. As shown, the unit coils are connected to one another via connecting wires. Regarding the U-phase coil 5*u*, the unit coils B4, B3, B2 and B1 are wound in one direction in this order with the neutral terminal N2 serving as a winding start end. Furthermore, the unit coils A1, A2, A3 and A4 are wound in the same direction as the unit coils B1 to B4 with the neutral terminal N1 serving as a winding terminal end. All the unit coils are wound in the same direction or clockwise as viewed from inside the stator core 4. A connecting wire connecting between the unit coils A1 and B1 serving as one end of the U-phase coil 5*u* is cut, and cut ends of the connecting wire serve as start ends of the first and second coil groups A and B. The start ends of the first and second coil groups A and B are connected to power supply input terminals Pu1 and Pu2 to which U-phase power is supplied, respectively. The power supply input terminals Pu1 and Pu2 are connected to the power supply input terminal Pu (FIG. 4). On the other hand, the winding terminal end of the unit coil A4 and the winding start end of the unit coil B4 both serving as the other end of the U-phase coil 5*u* are connected to the neutral terminals N1 and N2 respectively.

In the first coil group A (5*u*1), electric power is supplied via the winding start end to the first coil group A (5*u*1) and electric power is supplied via the winding terminal end to the second coil group B (5*u*2). Accordingly, the unit coils A1 to A4 (U1 to U4) of the first coil group A have the same polarity and the unit coils B1 to B4 (U1' to U4') of the second coil group B have the same polarity that is opposite to that of the unit coils A1 to A4 (U1 to U4). The U-phase coil 5*u* thus has eight magnetic poles as the result of the above-described configuration.

In the unit coils A1 to A4 (U1 to U4) of the first coil group A (5*u*1), a connecting wire connecting between the unit coils A1 and A2 of the first coil group A (5*u*1) is arranged at the side of one of two axial end surfaces of the stator core 4, which one end surface is located opposite the power supply input terminal Pu1, as shown in FIG. 1. A connecting wire connecting between the unit coils A2 and A3 of the first coil group A (5*u*1) is arranged so as to extend from the unit coil A2 via the axial end surface of the stator core 4 opposite the power supply input terminal Pu1 and further via a left end of the slot 6 accommodating the unit coil A1 along the other axial end surface of the stator core 4 at the power supply input terminal Pu1 side. A connecting wire connecting between the unit coils A3 and A4 of the first coil group A (5*u*1) is arranged so as to extend from the unit coil A3 via a circumferential edge of the stator core 4 located opposite the power supply input terminal Pu1 to the side of the axial end surface at the power supply input terminal Pu1 side.

Furthermore, in the unit coils B1 to B4 (U1' to U4') of the second coil group B (5*u*2) constituting the U-phase coil 5*u*, a connecting wire connecting between the unit coils B1 and B2 is arranged at the side of one of two axial end surfaces of the stator core, which one axial end surface is located opposite the power supply input terminal Pu2. A connecting wire connecting between the unit coils B2 and B3 is arranged so as to extend from the unit coil B2 via the axial end surface of the stator core 4 opposite the power supply input terminal Pu2 and further via a right end of the slot 6 of the stator core 4 accommodating the unit coil B1 to the other axial end surface of the stator core 4 at the power supply input terminal Pu2 side. A connecting wire connecting between the unit coils B3 and B4 is arranged so as to extend from the unit coil B3 via the circumferential edge of the stator core 4 located opposite the power supply input terminal Pu2 to the side of the axial end surface at the power supply input terminal Pu2 side.

The V-phase coil 5*v* is displaced by an amount corresponding to four slots relative to the U-phase coil 5*u*, and the unit coils of the V-phase coil 5*v* are accommodated in the slots 6 of the stator core 4 while being connected to one another by connecting wires. The W-phase coil 5*w* is also displaced by the amount corresponding to four slots relative to the V-phase coil 5*v*, and the unit coils of the W-phase coil 5*w* are accommodated in the slots 6 while being connected to one another by connecting wires, in the same manner as the U-phase coils 5*u*.

In the phase stator coils 5*u* to 5*w*, pieces of interphase insulation paper are provided for insulation between different phases such as coil ends of U- and V-phases or V- and W-phases. On the other hand, enamel films of conductive wires constituting the unit coils are provided for insulation between coil ends of the unit coils of the first coil group 5*u*1 and the unit coils of the second coil group 5*u*2, coil ends of the unit coils 5*v*1 and the coil ends of the second coil group 5*v*2 and coil ends of the first coil group 5*w*1 and the unit coils of the second coil group 5*w*2.

According to the above-described first embodiment, the second unit coil B2 (U2') of the second coil group B (5*u*2) is arranged in the neighborhood of the first unit coil A1 (U1) of the first coil group A (5*u*1), and the second unit coil A2 (U2) of the first coil group A is arranged in the neighborhood of the first unit coil B1 (U1') of the second coil group B. As a result, the fourth unit coil B4 having a large potential difference from the first unit coil A1 is prevented from being adjacent to the first unit coil A1. Accordingly, the insulation performance of the stator 2 of the first embodiment can be improved, whereupon the stator 2 can cope with high power supply voltage.

Since the insulation performance is improved in the first embodiment, no insulator needs to be provided between the unit coils of the first and second coil groups A and B for the purpose of reinforcement. Accordingly, sufficient insulation can be ensured by the stator 2.

Furthermore, according to the permanent magnet motor employing the stator 2 of the embodiment, the insulation performance of the stator 2 is improved, whereby insulators need not be reinforced. Consequently, the permanent magnet motor can cope with high power supply voltage, whereby the permanent magnet motor can be reduced in size and can develop higher output.

Second Embodiment

Figure 5:
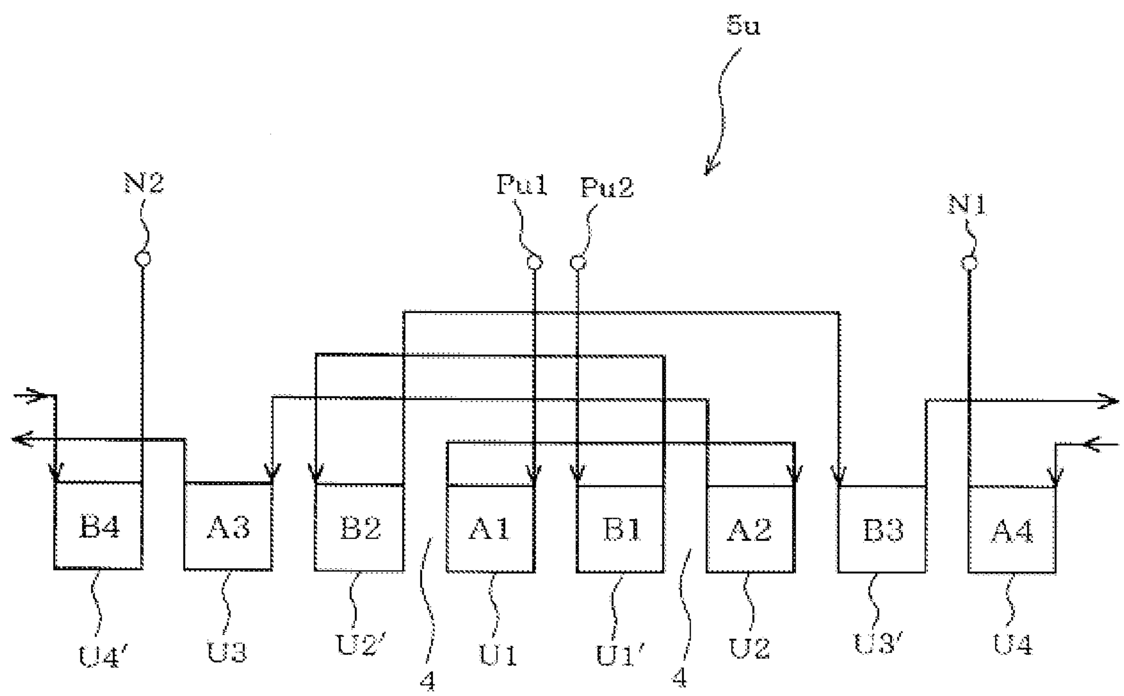
FIG. 5 is a view similar to FIG. 1, showing a second embodiment.

FIG. 5 illustrates a second embodiment. The second embodiment is the same as the first embodiment in the arrangement of the unit coils A1 to A4 (U1 to U4) and the unit coils B1 to B4 (U1' to U4') of the first and second coil groups A and B (5*u*1 and 5 *u*2) of the U-phase coil 5*u*. Accordingly, the connection of the unit coils of the U-phase coil 5*u* will now be described.

In the unit coils A1 to A4 of the first coil group A, a connecting wire connecting between the unit coils A1 and A2 extends through the circumferential edge of the stator core 4 at the power supply input terminal Pu1 side. A connecting wire connecting between the unit coils A2 and A3 also extends through the circumferential edge of the stator core 4 at the power supply input terminals Pu1 side. A connecting wire connecting between the unit coils A3 and A4 extends through the circumferential edge of the stator core 4 located opposite the power supply input terminal Pu1. These connecting wires are arranged at the side of the end surface of the stator core 4 at the power supply input terminal Pu1 side.

Furthermore, in the unit coils B1 to B4 of the second coil group B, a connecting wire connecting between the unit coils B1 and B2 extends through the circumferential edge of the stator core 4 at the power supply input terminal Pu2 side. The connecting wire connecting between the unit coils B2 and B3 also extends through the circumferential edge of the stator core 4 at the power supply input terminal Pu2 side. The connecting wire connecting between the unit coils B3 and B4 extends through the circumferential edge of the stator core 4 located opposite the power supply input terminal Pu2 side. These connecting wires are all arranged at the side of the end surface of the stator core 4 at the power supply input terminal Pu2 side.

Thus in the second embodiment, the connecting wires connecting between the unit coils of the first and second coil groups A and B are arranged at either one of the two end surfaces of the stator core 4. The V-phase coil 5*v* and the W-phase coil 5*w* are configured in the same manner as the U-phase coil 5*u*.

The second embodiment can achieve the same advantageous effects as the first embodiment. In particular, the connecting wires of the first and second coil groups A and B are arranged at the side of one of the two axial end surfaces of the stator core 4, in which one axial end surface side the power supply input terminals Pu1 and Pu2 and the neutral terminals N1 and N2 are located. Consequently, the connecting wires can be handled more easily.

Third Embodiment

Figure 6:
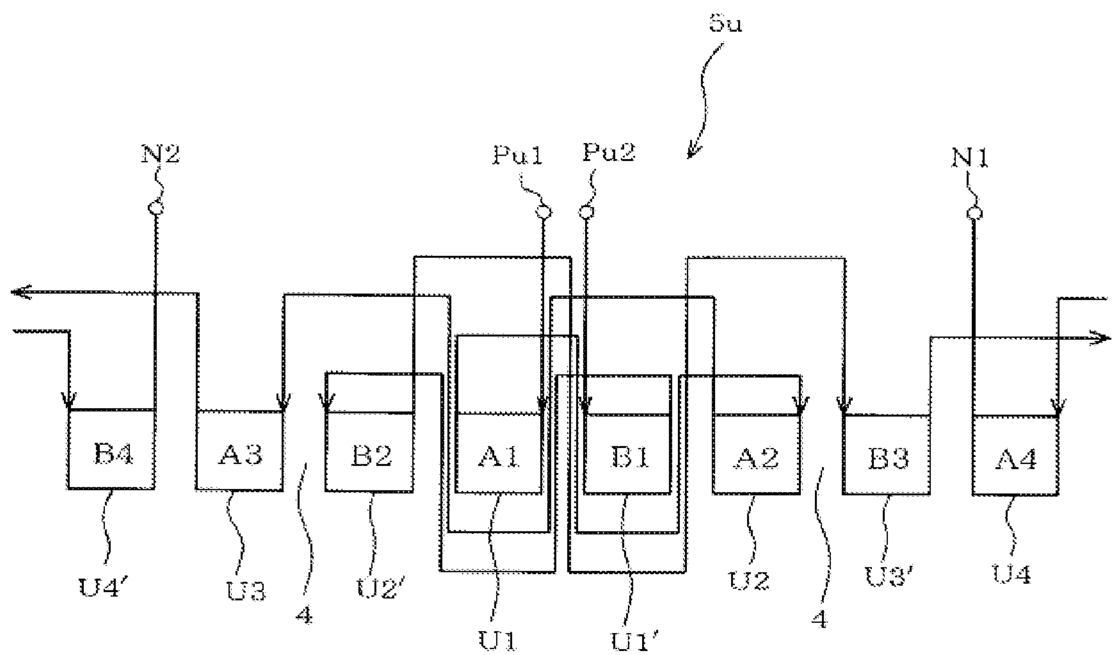
FIG. 6 is a view similar to FIG. 1, showing a third embodiment.

FIG. 6 illustrates a third embodiment. The third embodiment is the same as the first embodiment in the arrangement of the unit coils A1 to A4 (U1 to U4) and the unit coils B1 to B4 (U1' to U4') of the first and second coil groups A and B (5*u*1 and 5 *u*2) of the U-phase coil 5*u*. Accordingly, the connection of the unit coils of the U-phase coil 5*u* will now be described below.

In the unit coils A1 to A4 of the first coil group A, a connecting wire connecting between the unit coils A1 and A2 extends through one of axial end surfaces of the stator core 4, which one end surface is located at the power supply input terminal Pu1 side. A connecting wire extends through a left end of the slot 6 accommodating the unit coil B1, further extending through the end surface of the stator core 4 located opposite the power supply input terminal Pu1. The connecting wire further extends through a right end of the slot 6 accommodating the unit coil B1 to be arranged at the side of the end surface of the stator core 4 located at the power supply input terminal Pu1 side. A connecting wire connecting between the unit coils A2 and A3 extends through the end surface of the stator core 4 located at the power supply input terminal Pu1 side. The connecting wire extends through the right end of the slot 6 accommodating the unit coil A1, further extending through the end surface of the stator core 4 located opposite the power supply input terminal Pu1. The connecting wire further extends through the left end of the slot 6 accommodating the unit coil A1 to be arranged at the side of the end surface of the stator core 4 located at the power supply input terminal Pu1 side. A connecting wire connecting between the unit coils A3 and A4 extends through the circumferential edge of the rotor core 4 located opposite the power supply input terminal Pu1 to be arranged at the side of the end surface of the rotor core 4 located at the power supply input terminal Pu1 side.

In the unit coils B1 to B4 of the second coil group B, a connecting wire connecting between the unit coils B1 and B2 extends through the end surface of the stator core 4 located at the power supply input terminal Pu2 side. The connecting wire then extends through the right end of the slot 6 accommodating the unit coil A1, further extending through the end surface of the stator core 4 located opposite the power supply input terminal Pu2 side. The connecting wire further passes through the left end of the slot 6 accommodating the unit coil A1 to be arranged at the side of the end surface of the stator core 4 located at the power supply input terminal Pu2 side. A connecting wire connecting between the unit coils B2 and B3 extends through the end surface of the stator core 4 located at the power supply input terminal Pu2 side. The connecting wire then passes through the left end of the slot 6 accommodating the unit coil B1, further extending through the end surface of the stator core 4 located opposite the power supply input terminal Pu2 side. The connecting wire further extends through the right end of the slot 6 accommodating the unit coil A1 to be arranged at the side of the end surface of the stator core 4 located at the power supply input terminal Pu2 side. A connecting wire connecting between the unit coils B3 and B4 extends through the circumferential edge of the stator core 4 located opposite the power supply input terminal Pu2 to be arranged at the side of the end surface of the stator core 4 located at the power supply input terminal Pu2 side.

The V-phase coil 5*v* and the W-phase coil 5*w* are configured in the same manner as the above-described U-phase coil 5*u*.

The third embodiment can achieve the same advantageous effects as the first embodiment. In particular, the connecting wire connecting between the unit coils A1 and A2 and the connecting wire connecting between the unit coils B2 and B3 form one-turn coils of the unit coil B1 respectively. Furthermore, the connecting wire connecting between the unit coils A2 and A3 and the connecting wire connecting between the unit coils B1 and B2 form one-turn coils of the unit core A1 respectively. Consequently, the intensity of magnetic flux can be improved.

Fourth Embodiment

Figure 7:
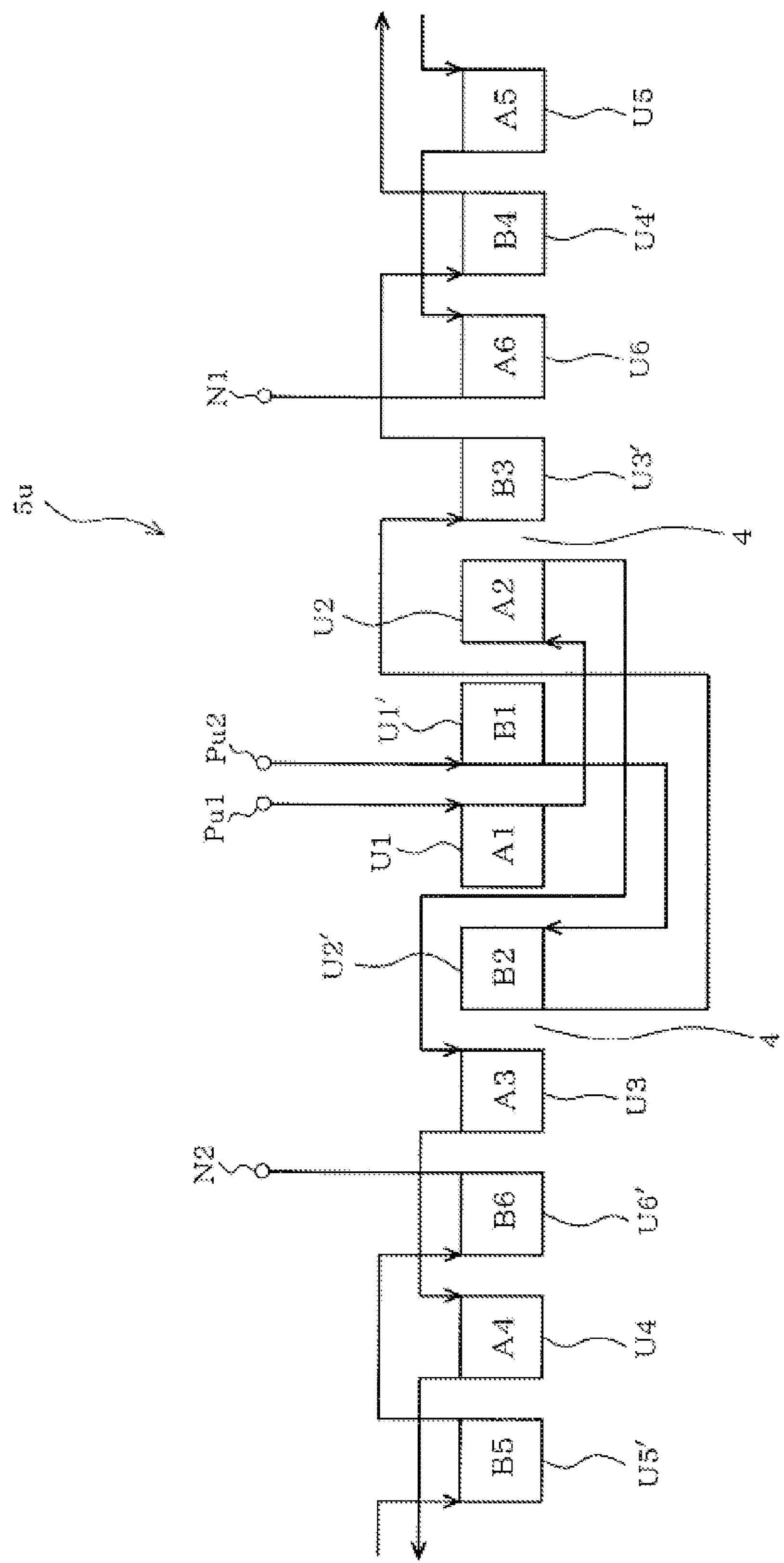
FIG. 7 is a view similar to FIG. 1, showing a fourth embodiment.
Figure 8:
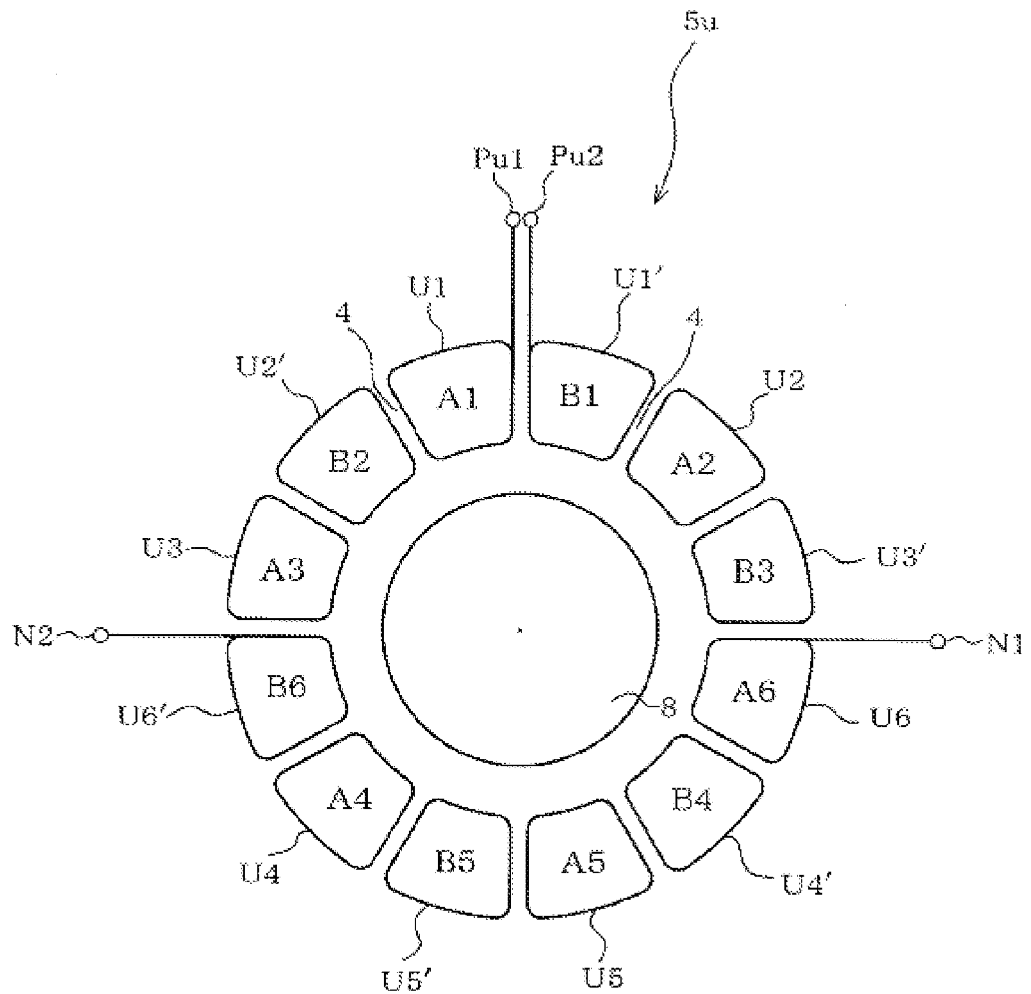
FIG. 8 is a view similar to FIG. 2, showing the fourth embodiment.

FIGS. 7 and 8 illustrate a fourth embodiment. The fourth embodiment is applied to a three-phase twelve-pole stator 2. The U-phase coil 5*u* is composed of twelve unit coils (n=12), that is, the unit coils A1 to A6 (U1 to U6) of the first coil group A and the unit coils B1 to B6 (U1' to U6') of the second coil group B.

The fourth embodiment has the same arrangement and connection of the unit coils A1 to A3 and B1 to B3 as the first embodiment. The unit coils A4 to A6 and B4 to B6 are arranged so that the unit coils A6 and B6 are adjacent to the unit coils B3 and A3 respectively, as shown in FIG. 8. The unit coils A4 to A6 and B4 to B6 are arranged so that the unit coils B4 and A4 are adjacent to the unit coils A6 and B6 respectively. The unit coils A4 to A6 and B4 to B6 are further arranged so that the unit coils A5 and B5 are adjacent to the unit coils B4 and A4 respectively. The unit coils A4 to A6 and B4 to B6 are still further arranged so that the unit coils A5 and B5 are adjacent to each other at a lower part of the stator core 4.

The unit coils A3 and A4 are connected together by a connecting wire as shown in FIG. 7. The unit coils A4 and A5 are also connected together by a connecting wire. The unit coils A5 and A6 are further connected together by a connecting wire. These connecting wires all extend through the circumferential edge of the stator core 4 located opposite the power supply input terminal Pu1 to be arranged at the side of the end surface of the stator core 4 at the power supply input terminal Pu1 side. Furthermore, the connecting wires connecting between the unit coils B3 and B4, B4 and B5 and B5 and B6 all extend through the circumferential edge of the stator core 4 located opposite the power supply input terminal Pu2 to be arranged at the side of the end surface of the stator core 4 at the power supply input terminal Pu2 side.

The V-phase and W-phase coils 5*v* and 5*w* are configured in the same manner as the above-described U-phase coil 5*u*.

According to the fourth embodiment, the sixth unit coils A6 and B6 serving as final unit coils are adjacent to third unit coils A3 and B3 but not to the first unit coils A1 and B1, respectively. Consequently, the fourth embodiment can achieve the same advantageous effects as the first embodiment.

Fifth Embodiment

Figure 9:
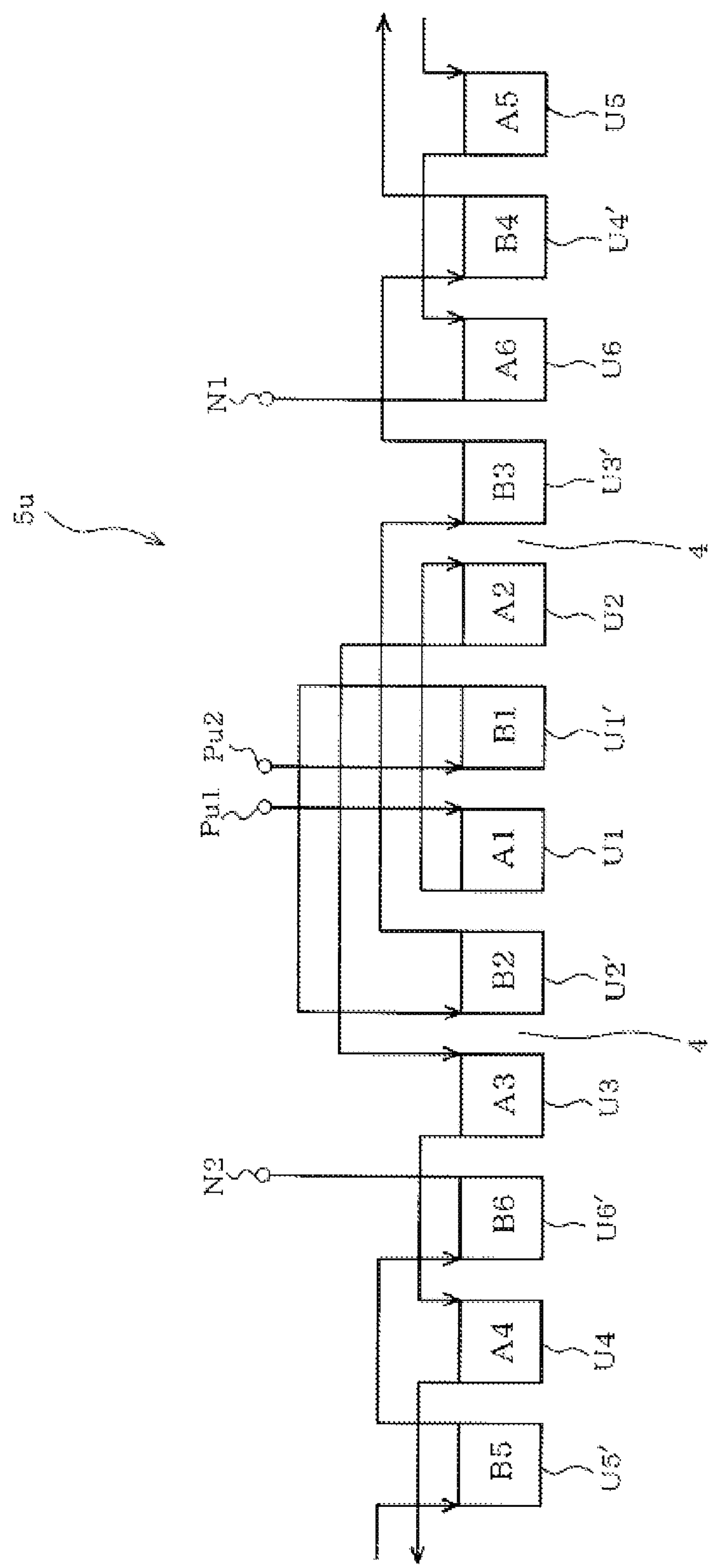
FIG. 9 is a view similar to FIG. 1, showing a fifth embodiment.

FIG. 9 illustrates a fifth embodiment. The U-phase coil 5*u* includes twelve unit coils in the fifth embodiment. The unit coils A1 to A6 and B1 to B6 of the U-phase coil 5*u* are arranged in the same manner as those of the above-described fourth embodiment. Furthermore, the unit coils A1 to A3 and B1 to B3 are connected in the same manner as those of the second embodiment. The unit coils A4 to A6 and B4 to B6 are connected in the same manner as those of the fourth embodiment.

The V-phase and W-phase coils 5*v* and 5*w* are configured in the same manner as the above-described U-phase coil 5*u*.

The fifth embodiment can achieve the same advantageous effects as the fourth embodiment. In particular, the connecting wires connecting between the unit coils of the first and second coil groups A and B are all arranged at one of two axial end surfaces of the stator core 4. Accordingly, the fifth embodiment can achieve the same advantageous effects as the second embodiment.

Sixth Embodiment

Figure 10:
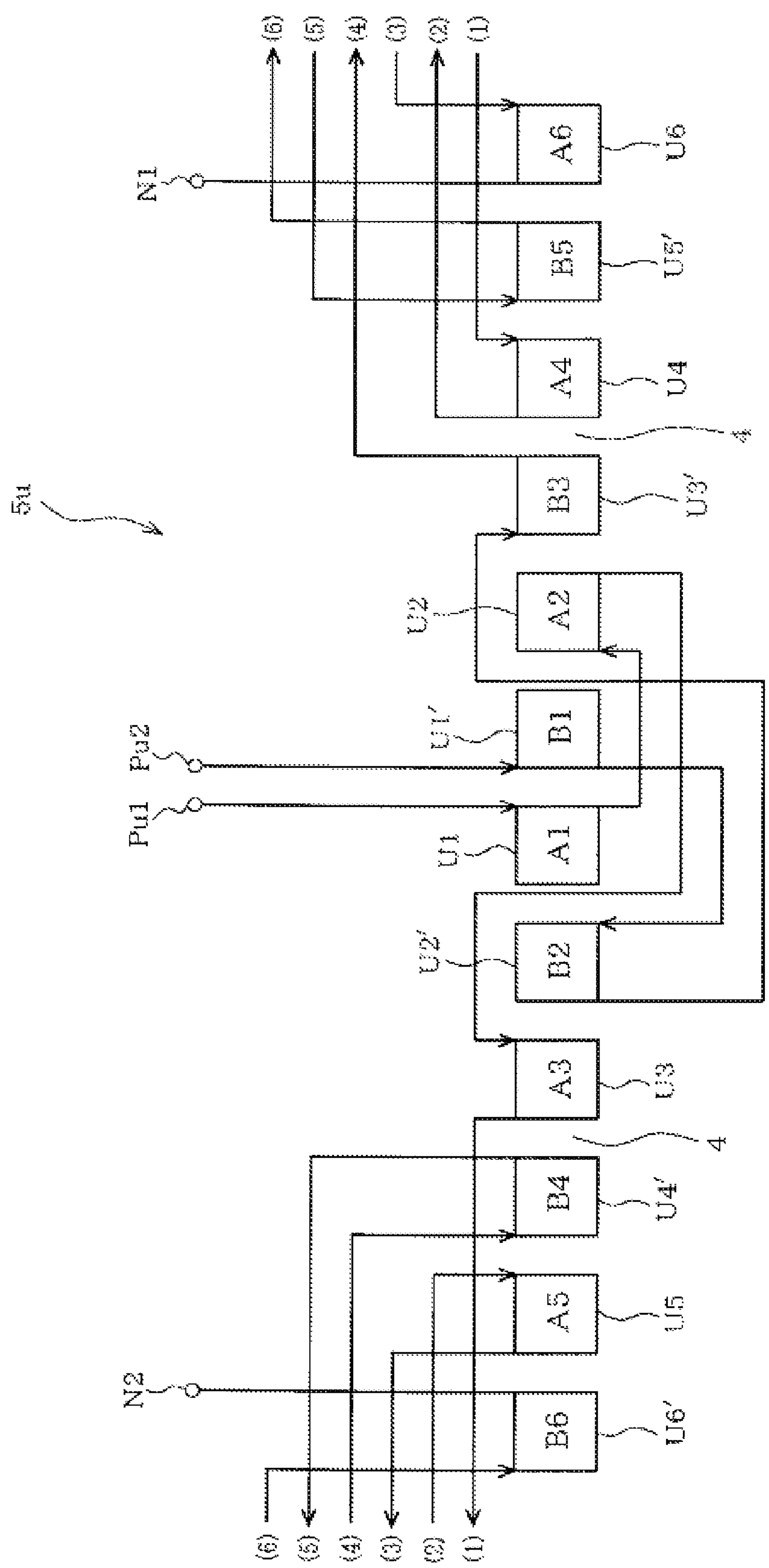
FIG. 10 is a view similar to FIG. 1, showing a sixth embodiment.
Figure 11:
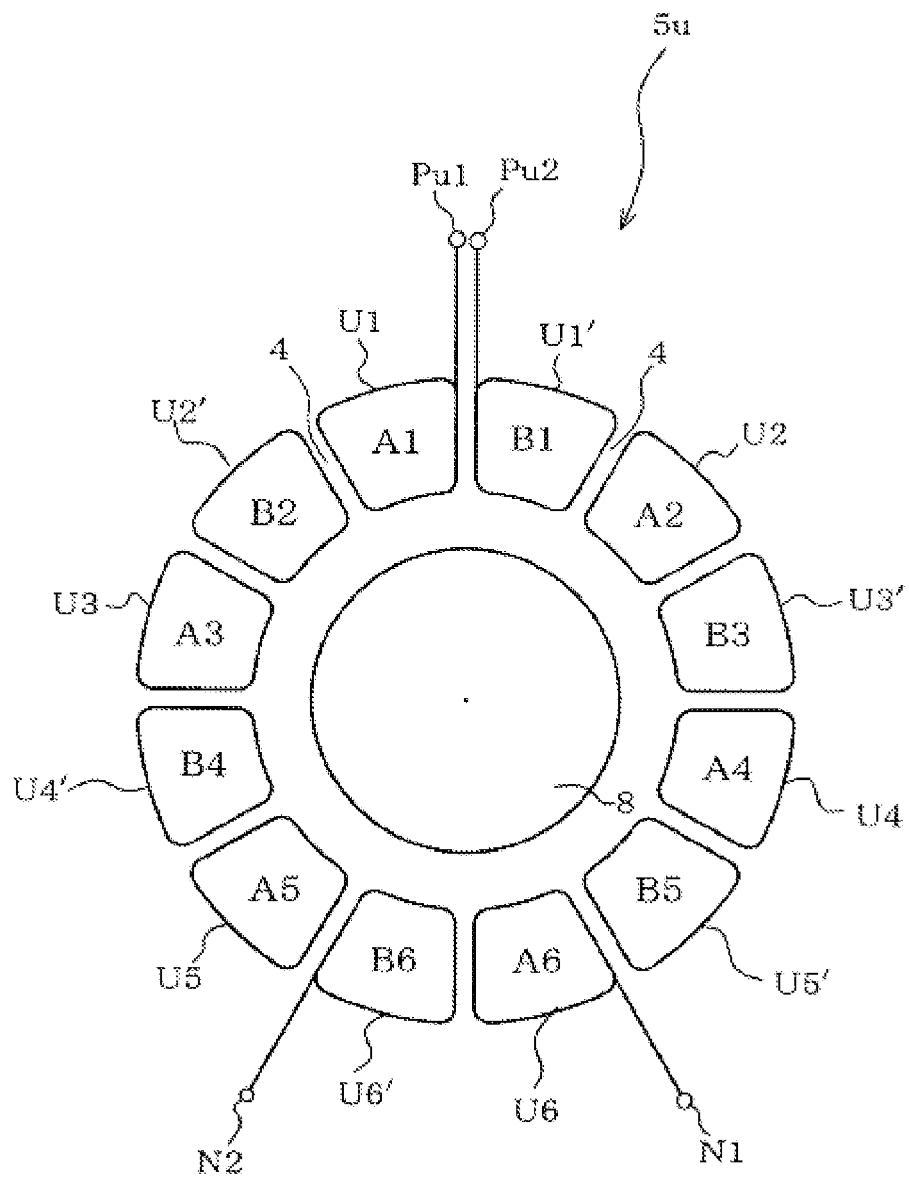
FIG. 11 is a view similar to FIG. 2, showing the sixth embodiment.

FIGS. 10 and 11 illustrate a sixth embodiment. The U-phase coil 5*u* includes twelve unit coils in the sixth embodiment. The unit coils A1 to A3 and B1 to B3 of the U-phase coil 5*u* are arranged in the same manner as those of the above-described first embodiment. The remaining unit coils are arranged as shown in FIG. 11. More specifically, the unit coils B3 and A3 are arranged adjacent to the unit coils A4 and B4 respectively. The unit coils A4 and B4 are arranged adjacent to the unit coils B5 and A5 respectively. The unit coils B5 and A5 are arranged adjacent to the unit coils A6 and B6 respectively. The unit coils A6 and B6 are arranged adjacent to each other at the lower part of the stator core 4.

The remaining unit coils are connected as shown in FIG. 10. More specifically, a connecting wire connecting between the unit coils A3 and A4 extends through the circumferential edge of the stator core 4 located opposite the power supply input terminal Pu1 to be arranged at the side of the end surface at the power supply input terminal Pu1 side. Connecting wires connecting between the unit coils A4 and A5 and between the unit coils A5 and A6 respectively also extend through the circumferential edge of the stator core 4 located opposite the power supply input terminal Pu1 to be arranged at the side of the end surface at the power supply input terminal Pu1 side. A connecting wire connecting between the unit coils B3 and B4 extends through the circumferential edge of the stator core 4 located opposite the power supply input terminal Pu2 to be arranged at the side of the end surface at the power supply input terminal Pu2 side.

The V-phase and W-phase coils 5*v* and 5*w* are configured in the same manner as the above-described U-phase coil 5*u*.

The sixth embodiment can achieve the same advantageous effects as the first embodiment. In particular, the unit coils A1, B2, A3, B4, A5 and B6 are sequentially arranged in the counter-clockwise direction, whereas the unit coils B1, A2, B3, A4, B5 and A6 are sequentially arranged in the clockwise direction. Consequently, the insulation performance of the stator can further be improved.

Seventh Embodiment

Figure 12:
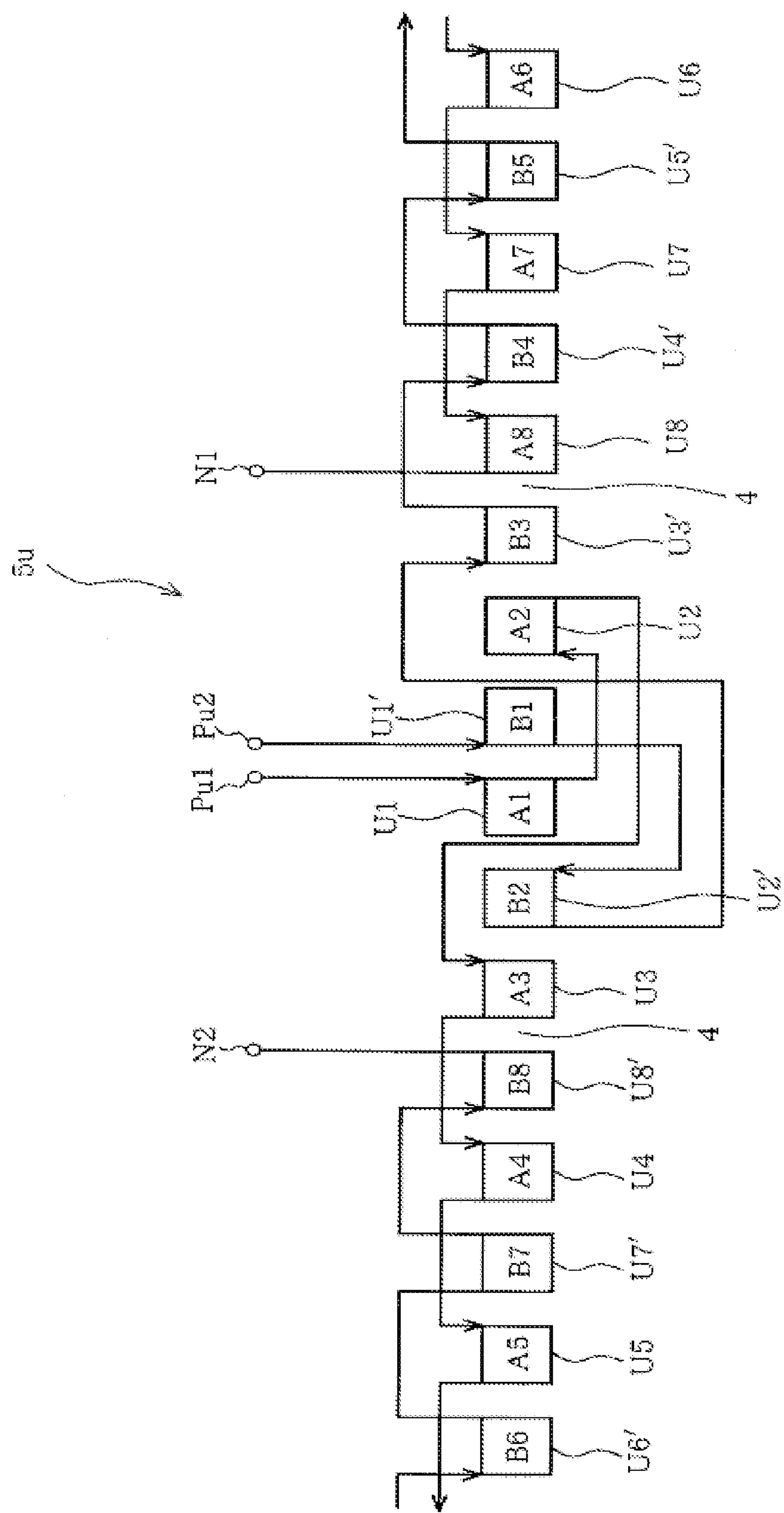
FIG. 12 is a view similar to FIG. 1, showing a seventh embodiment.
Figure 13:
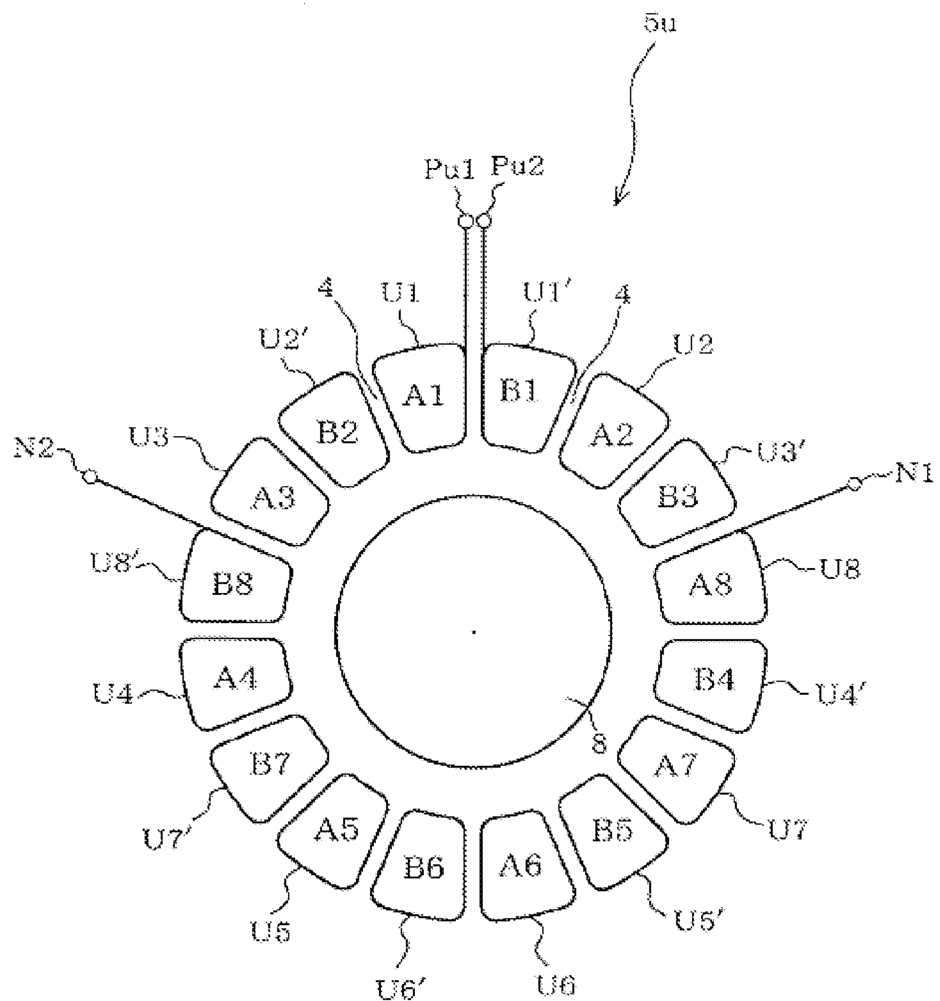
FIG. 13 is a view similar to FIG. 2, showing the seventh embodiment.

FIGS. 12 and 13 illustrate a seventh embodiment. The seventh embodiment is applied to a three-phase sixteen-pole stator 2. The U-phase coil 5*u* is composed of twelve unit coils (n=16), that is, the unit coils A1 to A8 (U1 to U8) of the first coil group A and the unit coils B1 to B8 (U1' to U8') of the second coil group B.

The arrangement and connection of the unit coils A1 to A3 and B1 to B3 in the seventh embodiment are the same as those of the first embodiment. The remaining unit coils are arranged as shown in FIG. 13. More specifically, the unit coils B3 and A3 are arranged adjacent to the unit coils A8 and b8 respectively. The unit coils A8 and B8 are arranged adjacent to the unit coils B4 and A4 respectively. The unit coils B4 and A4 are arranged adjacent to the unit coils A7 and B7 respectively. The unit coils A7 and B7 are arranged adjacent to the unit coils B5 and A5 respectively. The unit coils B5 and A5 are arranged adjacent to the unit coils A6 and B6 respectively. The unit coils A6 and B6 are arranged adjacent to each other at the lower part of the stator core 4.

The remaining unit coils are connected as shown in FIG. 12. More specifically, a connecting wire connecting between the unit coils A3 and A4 extends through the circumferential edge of the stator core 4 located opposite the power supply input terminal Pu1 to be arranged at the side of the end surface of the stator core 4 at the power supply input terminal Pu1 side. Four connecting wires connecting between the unit coils A4 and A5, the unit coils A5 and A6, the unit coils A6 and A7 and the unit coils A7 and A8 respectively also extend through the circumferential edge of the stator core 4 located opposite the power supply input terminal Pu1 to be arranged at the side of the end surface of the stator core 4 at the power supply input terminal Pu1 side.

Furthermore, a connecting wire connecting between the unit coils B3 and B4 extends through the circumferential edge of the stator core 4 located opposite the power supply input terminal Pu2 to be disposed at the side of the end surface of the stator core 4 at the power supply input terminal Pu2 side. Four connecting wires connecting between the unit coils B4 and B5, the unit coils B5 and B6, the unit coils B6 and B7 and the unit oils B7 and B8 respectively also extend through the circumferential edge of the stator core 4 located opposite the power supply input terminal Pu1 to be arranged at the side of the end surface of the stator core 4 at the power supply input terminal Pu1 side.

The V-phase and W-phase coils 5*v* and 5*w* are configured in the same manner as the above-described U-phase coil 5*u*.

According to the seventh embodiment, the eighth unit coils A8 and B8 serving as final unit coils are adjacent to third unit coils A3 and B3 but not to the first unit coils A1 and B1, respectively. Consequently, the seventh embodiment can achieve the same advantageous effects as the first embodiment.

Eighth Embodiment

Figure 14:
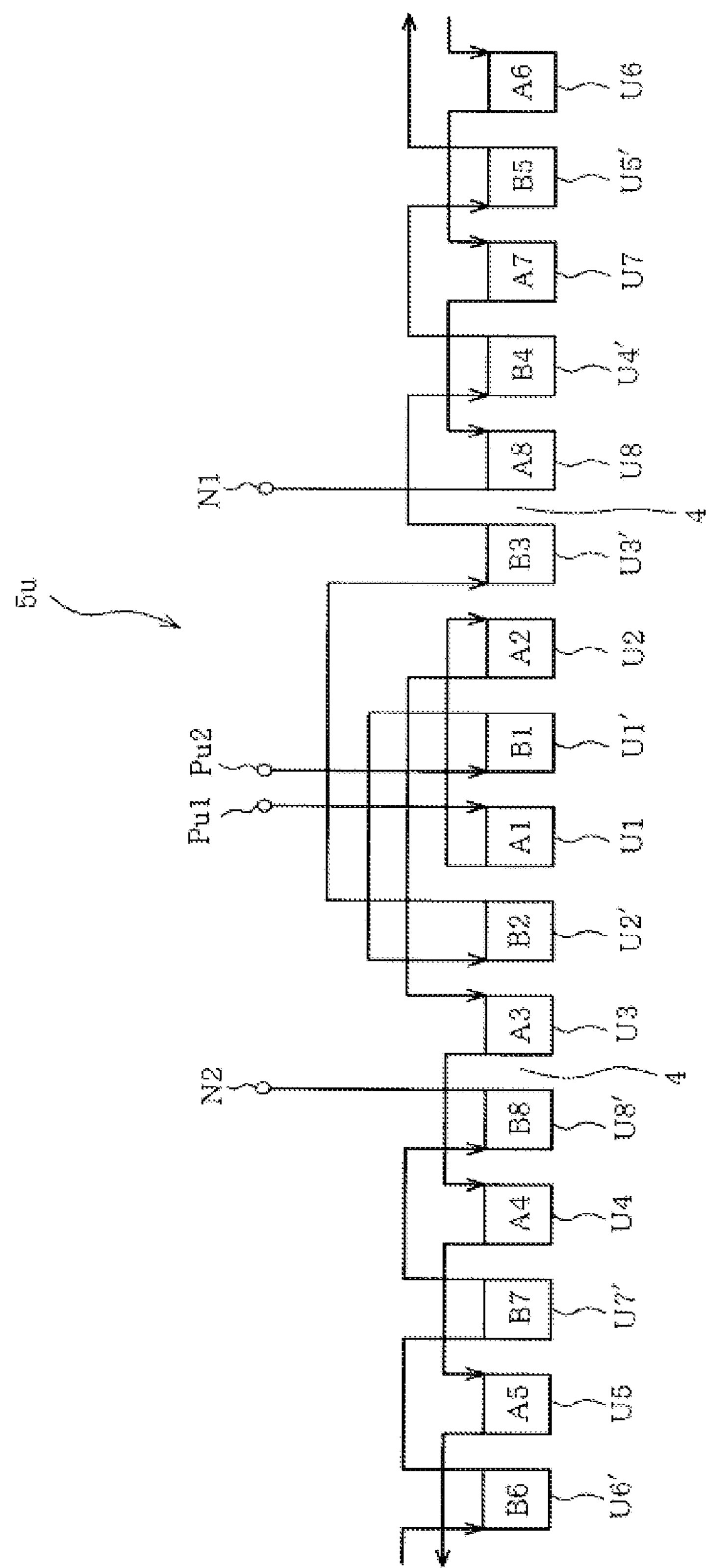
FIG. 14 is a view similar to FIG. 1, showing an eighth embodiment.

FIG. 14 illustrates an eighth embodiment. The U-phase coil 5*u* includes sixteen unit coils A1 to A8 and B1 to B8. The unit coils are arranged in the same manner as those of the seventh embodiment. In the connection of the unit coils, connecting wires connecting between the unit coils A1 and A2, A2 and A3, B1 and B2 and B2 and B3 are arranged in the same manner as in the second embodiment. Connecting wires connecting between the unit coils A3 and A4, A4 and A5, A5 and A6, A6 and A7 and A7 and A8 are arranged in the same manner as in the seventh embodiment. Connecting wires connecting between the unit coils B3 and A4, A4 and A5, A5 and A6, A6 and A7 and A7 and A8 are also arranged in the same manner as in the seventh embodiment.

The V-phase and W-phase coils 5*v* and 5*w* are configured in the same manner as the above-described U-phase coil 5*u*.

The eighth embodiment can achieve the same advantageous effects as the seventh embodiment. In particular, the connecting wires connecting between the unit coils of the first and second coil groups A and B are all disposed at one of two axial end surfaces of the stator core 4. Accordingly, the eighth embodiment can achieve the same advantageous effects as the second embodiment.

Other Embodiments

The foregoing embodiments should not be restrictive but can be modified without departing from the gist. For example, the stator 2 is configured into the three-phase eight-pole arrangement (n=8), the three-phase twelve-pole arrangement (n=12) and the three-phase sixteen-pole arrangement (n=16) in the foregoing embodiments. However, the stator 2 may be configured into a three-phase six-pole arrangement, instead. Thus, the stator 2 may be any one of stators each of which includes a stator coil with a plurality of phases and in which each phase stator coil includes an n-number of unit coils (n≥6 where n is an integer). The stator 2 thus configured may be applied to various types of rotating electrical machines.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A stator of a rotating electrical machine, which includes a stator core and stator coils of a plurality of phases wound on the stator core, the stator coils having:

an n number (where n≥6) of unit coils arranged circumferentially with respect to the stator core;

a first coil group constituted by a part of the unit coils, said part having a same polarity and being series connected, the first coil group having two terminals one of which is connected to a first power supply input terminal and the other of which is connected to a first neutral terminal; and a second coil group constituted by a remaining part of the unit coils, said remaining part having a polarity reverse to the unit coils of the first group and being series connected, the second coil group having two terminals one of which is connected to a second power supply input terminal and the other of which is connected to a second neutral terminal, wherein:

the unit coils constituting the first coil group include a first unit coil which is located nearest the first power supply terminal and is adjacent to a first unit coil which constitutes the second coil group and is located nearest the second power supply terminal;

the unit coils constituting the first coil group include a second unit coil which is located second nearest the first power supply terminal and is adjacent to the first unit coil of the second coil group;

the unit coils constituting the second coil group include a second unit coil which is located second nearest the second power supply terminal and is adjacent to the first unit coil of the first coil group;

the unit coils constituting the first coil group include a third unit coil which is located third nearest the first power supply terminal and is adjacent to the second unit coil of the second coil group; and the unit coils constituting the second coil group include a third unit coil which is located third nearest the second power supply terminal and is adjacent to the second unit coil of the first coil group.

2. The stator according to claim 1, wherein the stator core has slots provided for accommodating the unit coils and two axial ends further having end surfaces, respectively, the stator further comprising a first connecting wire series connecting the unit coils of the first coil group and a second connecting wire series connecting the unit coils of the second coil group, wherein the first and second connecting wires are arranged on both end surfaces of the stator core after having extended through the slots.

3. A rotating electrical machine comprising the stator of the rotating electrical machine, defined in claim 2 and a rotor provided in a field space of the stator.

4. The stator according to claim 1, wherein the stator core has two axial ends further having respective end surfaces, the stator further comprising a first connecting wire series connecting the unit coils of the first coil group and a second connecting wire series connecting the unit coils of the second coil group, wherein the first and second connecting wires are arranged at one end surface side in the axial direction of the stator core.

5. A rotating electrical machine comprising the stator of the rotating electrical machine, defined in claim 4 and a rotor provided in a field space of the stator.

6. A rotating electrical machine comprising the stator of the rotating electrical machine, defined in claim 1 and a rotor provided in a field space of the stator.

* * * * *